March 5, 1929.  J. COLECLIFFE ET AL  1,703,989
MACHINE FOR CRACKING AND SHELLING NUTS
Filed Feb. 24, 1927  3 Sheets-Sheet 1
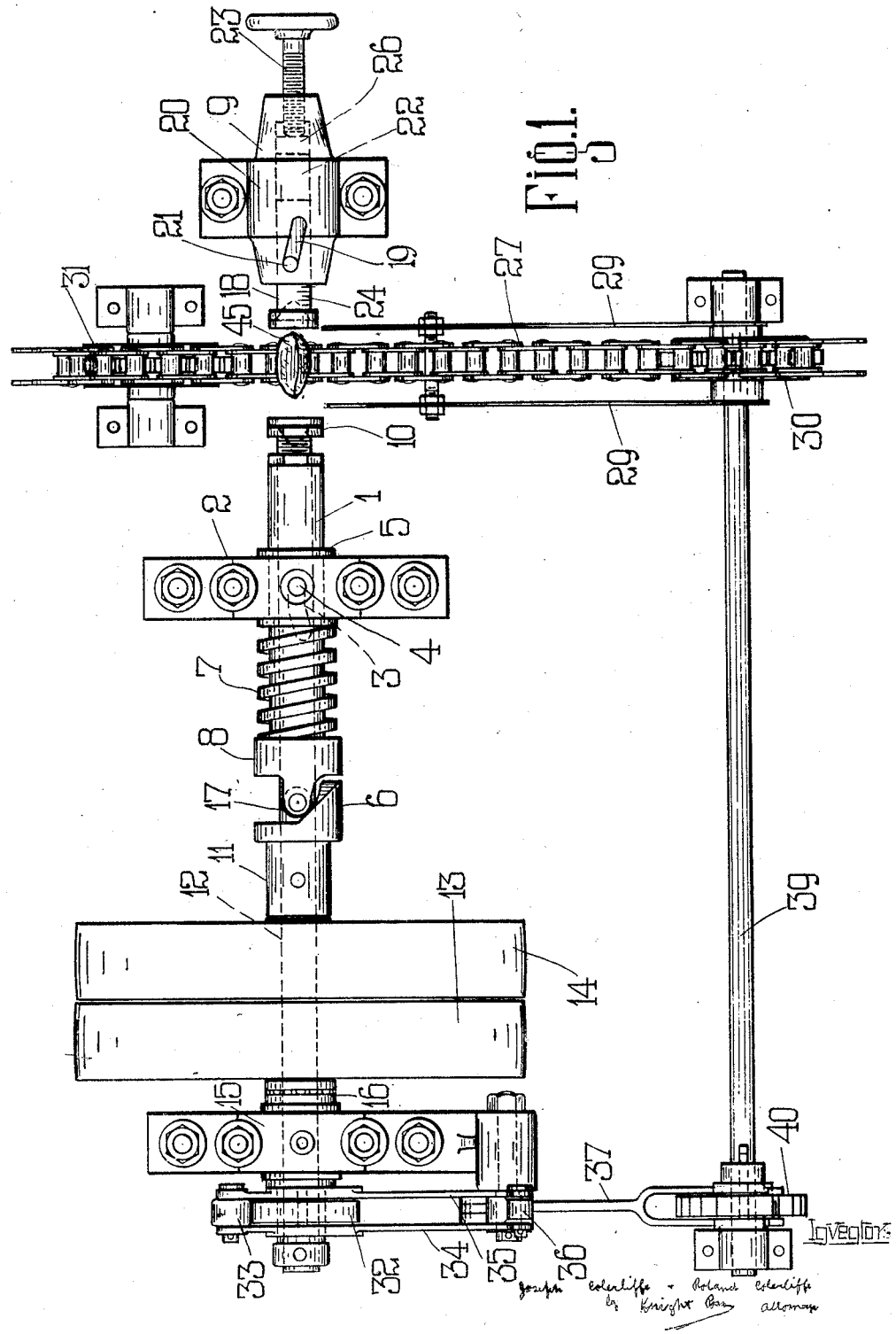

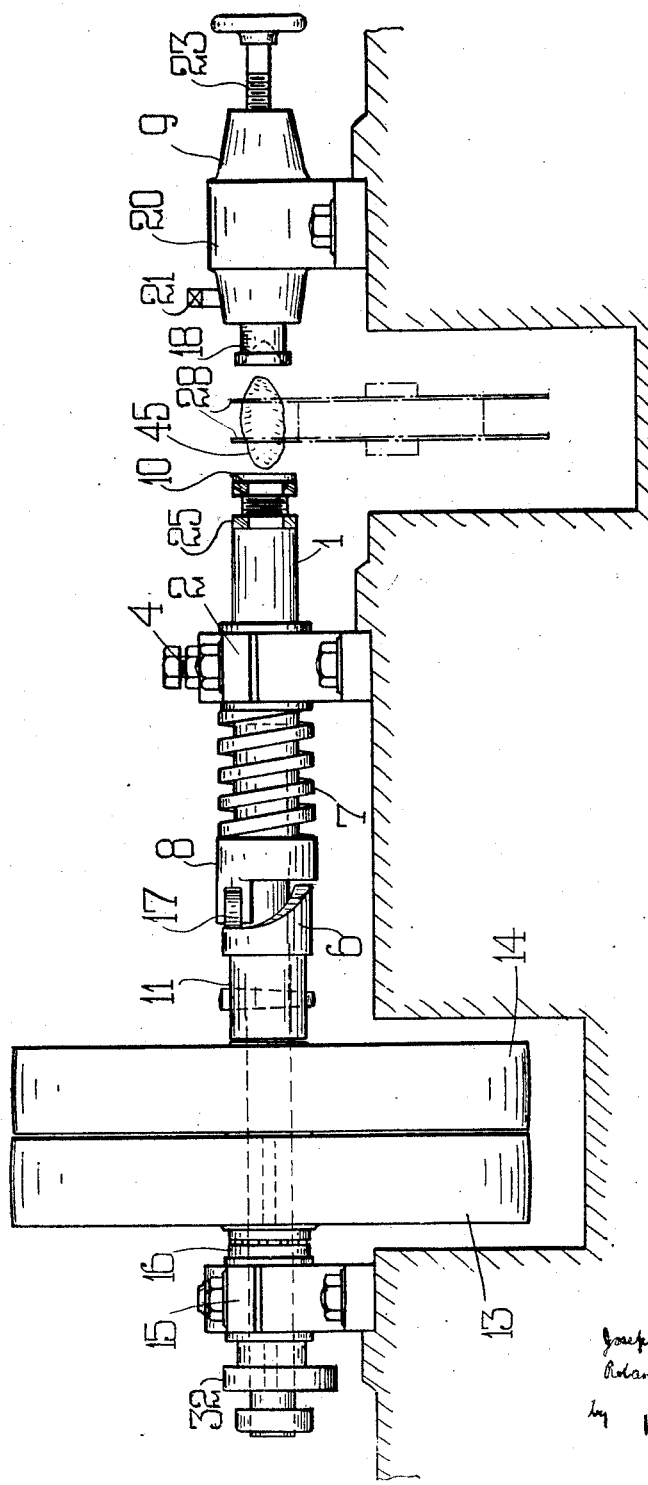

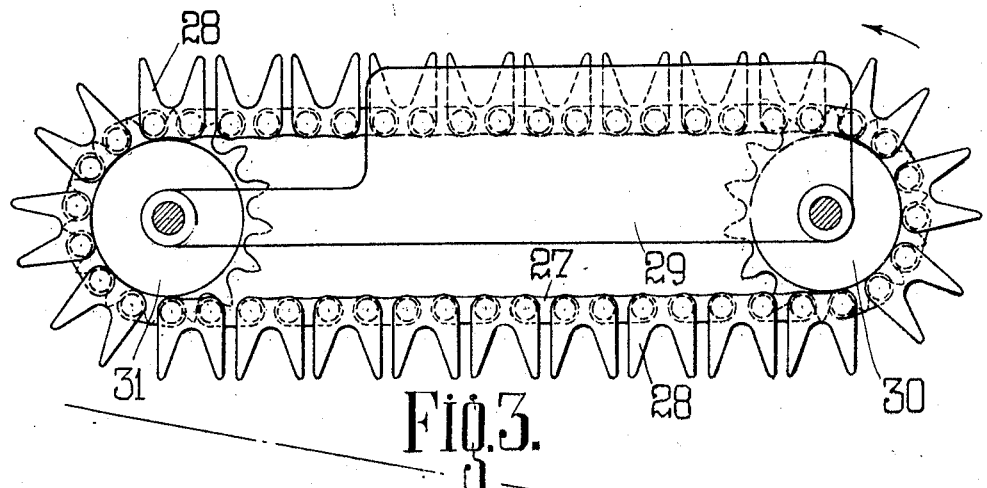
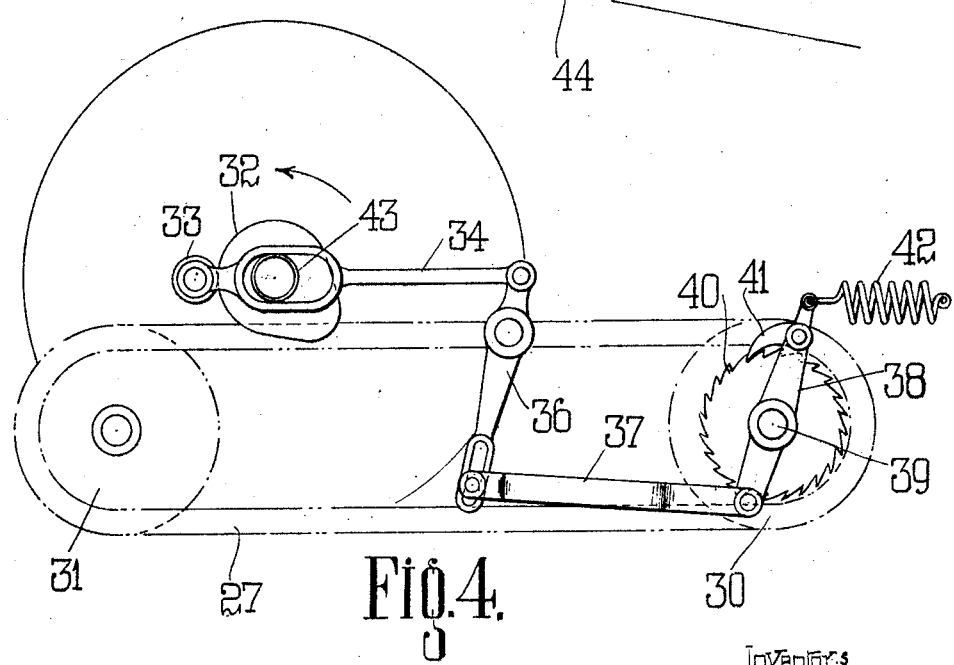

Patented Mar. 5, 1929.

1,703,989

UNITED STATES PATENT OFFICE.

JOSEPH COLECLIFFE AND ROLAND COLECLIFFE, OF LIVERPOOL, ENGLAND.

MACHINE FOR CRACKING AND SHELLING NUTS.

Application filed February 24, 1927, Serial No. 170,633, and in Great Britain February 2, 1927.

This invention relates to a machine for cracking and shelling nuts, such as Brazil nuts, walnuts, pecan nuts and other hard-shelled nuts.

The principal object of the invention is to provide a machine in which the shells of the nuts are cracked without bruising or damaging the kernels, by the application of a gradual pressure, as distinguished from a blow or a harsh sudden pressure; and a further object of the invention is to enable nuts of all shapes and sizes to be cracked without first being graded in size.

A nut-cracking machine according to our invention comprises a reciprocating cracking-element actuated in such manner as to apply a pressure gradually to the nut, an opposing resilient resistance-element, and means for imparting to one or both of said cracking-elements a turning or rotational movement about their axes for the purpose of breaking away the cracked shell. Preferably, the two cracking-elements are arranged to have a slight turning movement in opposite directions, so as more effectively to crack and separate the shells from the kernels.

The invention further comprises the use in a machine having the features just referred to of intermittently-operated means for successively feeding the nuts and holding them between the cracking elements. Such feeding mechanism, in the preferred construction, comprises an intermittently-operated endless chain-conveyor arranged at right angles to the cracking-elements and having links adapted to receive and hold the nuts. Further features of the invention are hereinafter described and claimed in the appended claims.

The invention will be further described with reference to the accompanying drawings, in which a machine constructed in accordance with our invention is shown, by way of example.

Figure 1 is a plan view.

Figure 2 is a side elevation.

Figures 3 and 4 are respectively, elevations of an endless chain-conveyor for feeding the nuts to the cracking elements, and its driving mechanism.

Referring to these drawings, 1 denotes a spring-controlled ram or plunger for applying the cracking pressure. This ram consists of a hollow shaft or bar, mounted to reciprocate in bearings in a pedestal or plummer-block 2, and formed with a longitudinal guide-slot 3. A pin or bolt 4 on the pedestal cap passes through a hole in the bearing-brass 5, and engages in the slot 3 to guide the ram during its operation by the cam 6 and also to limit its movement. In addition to its rectilinear movement a slight turning or twisting movement may be given to the ram during the cracking operation by making the slot 3 inclined, and it will be noted in this connection that the said slot is shown as being straight or parallel with the ram for a certain distance, and then inclined for the rest of its length. This gives the effect of breaking away the shell of the nut after a certain amount of pressure has been applied.

A helical spring 7, mounted on the ram 1 between a collar 8 secured thereon and the pedestal bearing block 2, tends continually to force the ram away from the opposing resilient resistance cracking element, denoted generally by 9.

In the outer end of the ram is adjustably mounted a seat-member 10, provided with a recess of conical or other shape to receive one end of the nut. This seat-member is screwed into the end of the ram 1 and secured by a lock-nut 25.

The spring-controlled ram 1 may be conveniently operated by a cam surface 6 of suitable shape on a collar 11 fastened on the end of the driving-shaft 12 which has fast and loose pulleys 13 and 14. The shaft 12 revolves in the pedestal 15, and is fitted with a thrust-bearing 16. The cam 6 revolves against an anti-friction roller 17 mounted on the end of the ram 1, and is adapted to move the ram forwards towards the other cracking element 9 and against the pressure of its spring 7.

The other cracking element comprises a seat-member 18 resiliently mounted in the housing 20. The seat-member 18 has a pin 21 working in a slot in the housing 20, and abuts at its rear against a rubber block 22, or other suitable resilient member. The seat-member 18 is preferably made axially adjustable in its casing, such as by means of a screw 23 acting on the block 26; and a graduated scale 24 can be provided on the seat-member to facilitate the adjustment. It will be noted that the slot 19 is inclined in the opposite direction from the slot 3, and by this means during the cracking operation the two cracking elements are given a slight turning movement in opposite directions. The first portion of the slot 19 may also be made with a straight portion, if desired, as in the case of the slot 3.

The surface of the recesses on the seat-members 10 and 18 may be ribbed or roughened so as to grip the nut when a combined pressure and twisting action is employed in the cracking operation. It is to be understood also that seat-members of other forms than those illustrated may be used.

Any suitable means, such as an endless conveyor, a feed-wheel, or other arrangement may be employed for feeding the nuts in between the cracking elements. In the construction shown in the drawings, the nut-feeding means consist of an endless chain-conveyor 27, adapted to carry the nuts and arranged at right angles to the cracking elements. This chain conveyor is intermittently operated to bring the nuts successively into alinement with the cracking elements. The links of the conveyor chain are shown as having forked extensions 28, projecting at right angles to the chain, in which the nuts rest. The chain for part of its upper run, from the driving sprocket wheel to the cracking elements, runs between side-plates 29, which prevent any lateral displacement of the nuts when being fed to the cracking members. These side plates may be made adjustable, if desired, to vary their distance apart.

The conveyor chain 27 runs over the sprocket-wheels 30 and 31, and may be operated by ratchet gearing, or in any other suitable manner. It moves intermittently, alternating with the forward movement of the ram 1, so as to be at rest when the ram is applying pressure to the nut to crack it, and then during the return stroke of the ram, the chain-conveyor moves forward a distance equal to the length of one link to bring another nut into the cracking position. As shown in Figs. 1 and 4, the conveyor 27 is operated by a cam 32 on the driving-shaft 12 revolving in contact with a roller 33 journalled at one end of the slotted links 34 and 35. These links are pivoted to a lever 36 having an adjustable pin-and-slot connection with a forked link 37. The other end of the link 37 is pivoted to the lower end of a ratchet-lever 38 fulcrumed on a shaft 39 on which are keyed both the sprocket-wheel 30 and a ratchet-wheel 40, the latter being actuated by a pawl 41 on each forward stroke of the lever 38. 42 is a spring for effecting the return stroke of the ratchet-lever and pawl, and 43 are rollers on the shaft 12 running in slots of the links 34 and 35. It will be understood that the cam 32 controlling the drive of the chain-conveyor is so arranged in relation to the cam 6 that operates the ram 1, that the ram is making its return stroke while the conveyor is moving one step, and vice versa.

The operation of the machine is as follows:—

The cam 6 operating the spring-controlled ram 1 is so designed as to move the ram towards the resilient resistance element 9 against the pressure of the spring 7, and in such manner as to apply a gradual pressure to the nut 45 gripped between the two cracking elements. In the first part of this movement, the straight portion of the slot 3 causes the ram 1 to have a simple rectilinear movement, until the nut is gripped between the seat-member 10 on the ram 1 and the seat-member 18 of the resilient resistance element, and then owing to the oppositely-inclined guide slots a slight twisting movement in opposite directions is imparted to the two cracking elements simultaneously with the application of the cracking pressure, which has the effect of breaking away the cracked shell from the kernel when a certain amount of pressure has been applied. By reason of the nut being cracked by the pressure gradually applied by the ram against the resilient resistance offered by the resilient cracking element, which acts as a buffer, the shell of the nut is cracked without damage to the kernel. The further rotation of the cam 6 permits the ram 1 to move quickly back under the action of the spring 7 and so release the cracked nut, and at the same time the conveyor-chain 27 is operated by its driving mechanism to bring another nut into position between the cracking elements. The nuts to be cracked are placed by the operator on the chain so as to rest in the recessed extensions 28 of the links, and the cracked nuts are carried along and may be delivered down a shoot 44 towards the operator.

We declare that what we claim is:—

1. A machine for cracking and shelling nuts, comprising a reciprocating cracking-element provided with means for applying pressure gradually to the nut, an opposing resilient resistance-element spaced from said reciprocating element, and means whereby said reciprocating cracking-element has imparted to it a rectilinear movement combined with a turning movement about its axis.

2. A machine for cracking and shelling nuts, comprising a reciprocating cracking-element provided with means for applying pressure gradually to the nut, an opposing resilient resistance-element spaced from said reciprocating element, and means whereby during the cracking operation the two cracking-elements are given an axial rotation in opposite directions.

3. A machine for cracking and shelling nuts, comprising a spring-controlled ram, an opposing resilient resistance-element spaced from said ram, a cam for imparting a rectilinear motion to the said ram in such manner as to apply a pressure gradually to the nut gripped between the ram and the resilient resistance-element, and pin and guide-slot mechanism for imparting a turning movement about its axis to the said ram during its rectilinear reciprocation.

4. A machine for cracking and shelling nuts, comprising a spring-controlled ram, an opposing resilient resistance-element spaced from said ram, a cam for imparting a rectilinear movement to the ram in such manner as to apply a pressure gradually to the nut gripped between the ram and the said resistance-element, pin-and-slot mechanism for imparting a turning or axial rotational movement to the said ram during its rectilinear movement, and intermittently-operated means for feeding the nuts successively between the cracking elements.

5. A machine for cracking and shelling nuts, comprising a spring-controlled ram, an opposing resilient resistance-element comprising a rubber block, a cam for imparting a rectilinear movement to the ram in such a manner as to apply a pressure gradually to the nut gripped between the ram and the resistance-element, pin-and-slot mechanism for imparting a rotational movement about their axes in opposite directions to the said ram and resilient resistance-element, and intermittently-operated means for feeding the nuts successively and holding them between the cracking-elements.

6. A machine for cracking and shelling nuts, comprising a reciprocating spring-controlled ram, an opposing resilient resistance element spaced from said ram, a cam for imparting a rectilinear motion to the ram in such manner as to apply a pressure gradually to the nut gripped between the ram and the resilient resistance element, guide-slots for controlling the movement of the said cracking-elements, adjustable seat-members on the opposing ends of the said cracking-elements to hold the nut to be cracked, and intermittently-operated means for feeding the nuts successively between the cracking-elements.

7. A machine for cracking and shelling nuts, comprising a spring-controlled ram, an opposing resilient resistance element spaced from said ram, means for imparting a rectilinear combined with a slight rotational movement to the ram in such manner as to apply a gradual pressure to the nut gripped between the ram and the resilient resistance element, means for permitting the resilient resistance element to have a slight rotational movement during the application of the cracking pressure, seat-members on the opposing ends of the cracking-elements to hold the nut to be cracked, and a chain-conveyor for feeding the nuts successively between the cracking-elements, the said chain-conveyor having means for carrying the nuts and being intermittently operated alternating with the return stroke of the ram.

8. A machine for cracking and shelling nuts, comprising a spring-controlled ram, an opposing resilient resistance spaced from said ram, means for imparting a rectilinear combined with a slight rotational movement to the ram in such manner as to apply a gradual pressure to the nut gripped between the ram and the resilient resistance element, means for permitting the resilient element to have a slight rotational movement during the application of the cracking pressure, seat-members on the opposing ends of the cracking-elements to hold the nut to be cracked, and means for feeding the nuts successively between the cracking-elements comprising a chain-conveyor having links with recessed extensions for carrying the nuts and intermittently operated alternating with the return stroke of the ram.

9. A machine for cracking and shelling nuts, comprising a spring-controlled ram, an opposing resilient resistance element spaced from said ram, means for imparting a rectilinear combined with a slight rotational movement to the ram in such manner as to apply a gradual pressure to the nut gripped between the ram and the resilient resistance element, means for permitting the resilient resistance element to have a slight rotational movement during the application of the cracking pressure, adjustable recessed seat-members on the opposing ends of the cracking-elements to hold the nut to be cracked, a chain-conveyor disposed at right angles to the cracking-elements and adapted to bring the nuts successively between the said cracking-elements, links on the chain-conveyor having extended portions recessed to hold the said nuts, a side-plate arranged on each side of the upper run of the chain-conveyor, and ratchet gearing adapted to operate the chain conveyor intermittently in synchronism with the return stroke of the ram in such manner as to move the conveyor forward the distance of one link to bring another nut between the cracking-elements.

In witness whereof, we have hereunto signed our names this 9th day of February, 1927.

JOSEPH COLECLIFFE.
ROLAND COLECLIFFE.